United States Patent
Zheng et al.

(10) Patent No.: US 10,320,592 B2
(45) Date of Patent: Jun. 11, 2019

(54) BIAS-VOLTAGE-ADJUSTABLE COMMUNICATIONS APPARATUS AND COMMUNICATION METHOD

(71) Applicant: Huawei Technologies Co., Ltd., Shenzhen (CN)

(72) Inventors: Guangwei Zheng, Shanghai (CN); Jinbo Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/024,270

(22) Filed: Jun. 29, 2018

(65) Prior Publication Data

US 2018/0309602 A1    Oct. 25, 2018

Related U.S. Application Data

(63) Continuation of application No. PCT/CN2016/109279, filed on Dec. 9, 2016.

(30) Foreign Application Priority Data

Dec. 31, 2015 (CN) .......................... 2015 1 1031138

(51) Int. Cl.
*H04L 25/06* (2006.01)
*H04B 1/16* (2006.01)
*H04B 1/00* (2006.01)

(52) U.S. Cl.
CPC ......... *H04L 25/064* (2013.01); *H04B 1/0028* (2013.01); *H04B 1/16* (2013.01); *H04L 25/06* (2013.01)

(58) Field of Classification Search
CPC ..... H04L 25/064; H04L 25/06; H04B 1/0028; H04B 1/16
See application file for complete search history.

(56) References Cited

U.S. PATENT DOCUMENTS 6,615,027 B1    9/2003  Sahota et al.
7,061,419 B2 *  6/2006  Sushihara ........... H03M 1/0604
                                                    341/155

(Continued)

FOREIGN PATENT DOCUMENTS

CN    1309835 A    8/2001
CN    1445932 A    10/2003

(Continued)

*Primary Examiner* — Sophia Vlahos

(57) ABSTRACT

A bias-voltage-adjustable communications apparatus including a radio frequency RF part, an analog-to-digital converter, a digital baseband communications processor, a voltage controller, and a voltage generator. The RF part is coupled to the analog-to-digital converter and the voltage controller. The voltage generator is coupled to the analog-to-digital converter and the voltage controller. The analog-to-digital converter is coupled to the digital baseband communications processor. In an adjustment mode, the RF part is configured to generate a single-ended reference signal, where the single-ended reference signal includes a first bias voltage; the voltage generator is configured to generate a second bias voltage; and the voltage controller is configured to obtain a difference between the first bias voltage and the second bias voltage, and generate a control signal based on the difference, where the control signal is configured to adjust the first bias voltage or the second bias voltage to decrease the difference.

17 Claims, 13 Drawing Sheets

(56) References Cited

U.S. PATENT DOCUMENTS

| | | | |
|---|---|---|---|
| 7,430,235 B2 | 9/2008 | Cheng et al. | |
| 8,456,339 B2 | 6/2013 | Zare-Hoseini | |
| 9,491,013 B2* | 11/2016 | Kwon | H04L 25/063 |
| 2003/0174079 A1 | 9/2003 | Soltanian et al. | |
| 2004/0023620 A1 | 2/2004 | Sahota et al. | |
| 2007/0170987 A1 | 7/2007 | Jung et al. | |
| 2010/0007392 A1 | 1/2010 | Hsu et al. | |
| 2010/0148871 A1 | 6/2010 | Lee et al. | |
| 2013/0229294 A1* | 9/2013 | Matsuno | H03M 1/0607 |
| | | | 341/155 |

FOREIGN PATENT DOCUMENTS

| | | |
|---|---|---|
| CN | 1451140 A | 10/2003 |
| CN | 1148873 C | 5/2004 |
| CN | 101005282 A | 7/2007 |
| CN | 101552608 A | 10/2009 |
| CN | 101626587 A | 1/2010 |
| CN | 101764580 A | 6/2010 |
| CN | 105656824 A | 6/2016 |
| EP | 1172928 A2 | 1/2002 |
| WO | 0005815 A1 | 2/2000 |

* cited by examiner

BIAS-VOLTAGE-ADJUSTABLE COMMUNICATIONS APPARATUS AND COMMUNICATION METHOD

CROSS-REFERENCE TO RELATED APPLICATIONS

This application is a continuation of International Application No. PCT/CN2016/109279 filed on Dec. 9, 2016, which claims priority to Chinese Patent Application No. 201511031138.9 filed on Dec. 31, 2015, the disclosures of the aforementioned applications are hereby incorporated by reference in their entireties.

TECHNICAL FIELD

The present application relates to the field of wireless communications technologies, and in particular, to a bias-voltage-adjustable communications apparatus and communication method.

BACKGROUND

A communications apparatus including a wireless base station and a wireless terminal may be configured to implement a wireless communication function. For a communications apparatus, during signal reception, the communications apparatus receives, by using an antenna, a radio frequency (RF) signal sent by a wireless communications peer end, converts the RF signal to an analog baseband signal, and further converts the analog baseband signal to a digital baseband signal by using an analog-to-digital converter (ADC). The communications apparatus may further perform demodulation processing on the digital baseband signal according to a wireless communications protocol, for example, a series of operations such as channel estimation, channel decoding, and signal demodulation. During signal transmission, the communications apparatus performs modulation processing on a digital baseband signal according to a wireless communications protocol, for example, a series of operations such as signal modulation, channel encoding, and signal flow interleaving, converts an obtained processing result of the digital baseband signal to an analog baseband signal, further converts the analog baseband signal to an RF signal, and sends the RF signal by using an antenna.

In actual application, during signal reception, the communications apparatus mainly includes an RF part that converts an RF signal to an analog baseband signal and a baseband processor that performs modulation/demodulation processing on the analog baseband signal. The baseband processor may include the analog-to-digital converter and a digital baseband communications processor. The digital baseband communications processor runs wireless communications protocol software to perform demodulation processing on the digital baseband signal output by the analog-to-digital converter. The wireless communications protocol software may comply with or support at least one RAT (radio access technology) of LTE (Long Term Evolution), CDMA2000 (Code Division Multiple Access 2000), WCDMA (Wideband Code Division Multiple Access), TD-SCDMA (Time Division-Synchronous Code Division Multiple Access), or GSM (Global System for Mobile Communications). One RAT is a wireless communications protocol or a communication system.

During signal reception, the RF part may transmit the converted-to analog baseband signal to the baseband processor in a manner of a single-ended signal or a differential signal. FIG. 1 shows a typical differential signal transmission manner. An RF part performs down-conversion on a received signal, to convert the signal to two differential analog baseband signals RX+ and RX−, and transmit the two differential analog baseband signals RX+ and RX− to a baseband processor. During signal transmission, the baseband processor sends two differential analog baseband signals TX+ and TX− to the RF part, and the RF part performs up-conversion on the two differential analog baseband signals TX+ and TX− to convert the two differential analog baseband signals TX+ and TX− to a to-be-sent RF signal, and sends the RF signal by using an antenna.

In the differential signal transmission manner, two analog interfaces need to be disposed on the RF part and the baseband processor separately. This increases complexity and costs of hardware for interface implementation. Therefore, using a single-ended signal transmission manner between the RF part and the baseband processor is more conducive to cost reduction. FIG. 2 shows a typical single-ended signal transmission manner. There is only one received signal RX and one sent signal TX between an RF part and a baseband processor. Relative to FIG. 1, a quantity of interfaces used on both the RF part and the baseband processor in FIG. 2 changes from 4 to 2.

However, in the single-ended signal transmission manner, a direct-current component of an analog baseband signal RX transmitted by the RF part to the baseband processor, that is, a large-signal voltage, a bias voltage, or a common-mode voltage, is very likely to exceed a dynamic input range of an analog circuit in the baseband processor, for example, the analog-to-digital converter. This raises a quite high requirement for a large dynamic input range of the analog-to-digital converter, and it is highly complicated to implement the analog-to-digital converter having the large dynamic input range. Therefore, this also increases design and manufacturing costs.

SUMMARY

Embodiments of the present disclosure provide a bias-voltage-adjustable communications apparatus and a communication method, to reduce communications apparatus implementation costs.

According to a first aspect, an embodiment of the present disclosure provides a bias-voltage-adjustable communications apparatus, including an RF part, an analog-to-digital converter, a digital baseband communications processor, a voltage controller, and a voltage generator. The RF part is coupled to the analog-to-digital converter and the voltage controller. The voltage generator is coupled to the analog-to-digital converter and the voltage controller. The analog-to-digital converter is coupled to the digital baseband communications processor. The communications apparatus is capable of working in an adjustment mode and an operation mode. In the adjustment mode, the RF part is configured to generate a single-ended reference signal, where the single-ended reference signal includes a first bias voltage; the voltage generator is configured to generate a second bias voltage; and the voltage controller is configured to obtain a difference between the first bias voltage and the second bias voltage, and generate a control signal based on the difference, where the control signal is used to adjust the first bias voltage or the second bias voltage to decrease the difference. In the operation mode, the RF part is configured to receive an RF signal, and perform down-conversion on the RF signal to convert the RF signal to a single-ended analog baseband signal, where the single-ended analog baseband signal includes the first bias voltage; the voltage generator is configured to generate the second bias voltage; the analog-to-digital converter is configured to: receive the single-ended analog baseband signal from the RF part, receive the second bias voltage from the voltage generator, and convert the single-ended analog baseband signal to a digital baseband signal under an action of the second bias voltage; and the digital baseband communications processor is configured to demodulate the digital baseband signal.

According to the technical solution provided in the first aspect, in the adjustment mode, the communications has a capability of adjusting the first bias voltage and the second bias voltage to decrease the difference between the first bias voltage and the second bias voltage. The communications apparatus may work in the operation mode and the adjustment mode. In the operation mode, the analog-to-digital converter of the communications apparatus uses the second bias voltage as a reference voltage to convert the single-ended analog baseband signal having the first bias voltage to the digital baseband signal, so as to process the digital baseband signal subsequently. In the adjustment mode, the difference between the first bias voltage and the second bias voltage has been decreased in the adjustment process. The first bias voltage and the second bias voltage continue to be used in the operation mode. After a communications device enters the operation mode, the analog-to-digital converter does not need a quite large dynamic input range to process the single-ended analog baseband signal having the first bias voltage and the second bias voltage. Therefore, implementation complexity and difficulty of the analog-to-digital converter are decreased, thereby reducing costs.

According to the first aspect, in a first possible implementation of the first aspect, the RF part includes a voltage adjustment circuit and a differential-to-single-ended circuit coupled to the voltage adjustment circuit. In the adjustment mode, the differential-to-single-ended circuit is configured to receive a differential reference signal, and generate the single-ended reference signal according to the differential reference signal. The voltage adjustment circuit is configured to receive the control signal, and adjust, under an action of the control signal, the first bias voltage of the single-ended reference signal generated by the differential-to-single-ended circuit. In this technical solution, the control signal is specifically used to adjust the first bias voltage of the single-ended reference signal output by the RF part, so that the RF part has a capability of adjusting common-mode output. In the adjustment mode, the second bias voltage is stable. The first bias voltage may be adjusted or changed. However, in the operation mode, both the first bias voltage and the second bias voltage are stable, ensuring that a circuit works properly.

According to the first possible implementation of the first aspect, in a second possible implementation of the first aspect, the RF part further includes a down-converter coupled to the differential-to-single-ended circuit. In the operation mode, the down-converter is configured to receive the RF signal, and convert the RF signal to an in-phase (I) analog baseband signal and a quadrature (Q) analog baseband signal that are orthogonal to each other. The differential-to-single-ended circuit is configured to receive the I analog baseband signal and the Q analog baseband signal, and generate the single-ended analog baseband signal. In this technical solution, the single-ended analog baseband signal is generated by the differential-to-single-ended circuit, and an existing down-converter that outputs I and Q signals is not changed greatly, with a purpose of using the prior art as much as possible. Optionally, the down-converter is also referred to as a mixer.

In the first or second possible implementation of the first aspect, the voltage adjustment circuit may alternatively be implemented by using several optional solutions. In a first optional solution, the voltage adjustment circuit includes an input end coupled to a first power line, multiple adjustable current sources connected in parallel that are coupled to the input end, a first output end that is coupled to the multiple adjustable current sources connected in parallel and that is configured to output an adjustable current, and a first resistor that is configured to receive the adjustable current and generate the first bias voltage. Each adjustable current source includes a current source and a first switch that are connected in serial to each other. The control signal is used to control a turn-on or turn-off state of multiple first switches to adjust a value of the adjustable current, so as to adjust the first bias voltage. In a second optional solution, the voltage adjustment circuit includes a constant current source configured to output a constant current, and a variable resistor configured to receive the constant current and generate the first bias voltage. The control signal is used to control a value of the variable resistor to adjust the first bias voltage. In a third optional solution, the voltage adjustment circuit includes multiple voltage dividers connected in serial that are coupled between a second power line and a ground line, multiple second switches coupled to the multiple voltage dividers connected in serial, and a second output end that is coupled to the multiple second switches and configured to output the first bias voltage. The control signal is used to control a turn-on or turn-off state of the multiple second switches to adjust the first bias voltage.

According to the first aspect, in a third possible implementation of the first aspect, the voltage generator includes a voltage adjustment circuit. In the adjustment mode, the voltage adjustment circuit is configured to generate the second bias voltage, and adjust the second bias voltage under an action of the control signal. In this technical solution, the control signal is specifically used to adjust the second bias voltage, with no need to adjust common-mode output of the RF part, so that all adjustment functions are implemented in a component other than the RF part. In this case, the RF part may entirely use the prior-art solution. In the adjustment mode, the first bias voltage is stable. The second bias voltage may be adjusted or changed. However, in the operation mode, both the first bias voltage and the second bias voltage are stable, ensuring that a circuit works properly.

In the third possible implementation of the first aspect, the voltage adjustment circuit may alternatively be implemented by using several optional solutions. In a first optional solution, the voltage adjustment circuit includes an input end coupled to a first power line, multiple adjustable current sources connected in parallel that are coupled to the input end, a first output end that is coupled to the multiple adjustable current sources connected in parallel and that is configured to output an adjustable current, and a first resistor that is configured to receive the adjustable current and generate the second bias voltage. Each adjustable current source includes a current source and a first switch that are connected in serial to each other. The control signal is used to control a turn-on or turn-off state of multiple first switches to adjust a value of the adjustable current, so as to adjust the second bias voltage. In a second optional solution, the voltage adjustment circuit includes a constant current source configured to output a constant current, and a variable resistor configured to receive the constant current and generate the second bias voltage. The control signal is used to control a value of the variable resistor to adjust the second bias voltage. In a third optional solution, the voltage adjustment circuit includes multiple voltage dividers connected in serial that are coupled between a second power line and a ground line, multiple second switches coupled to the multiple voltage dividers connected in serial, and a second output end that is coupled to the multiple second switches and configured to output the second bias voltage. The control signal is used to control a turn-on or turn-off state of the multiple second switches to adjust the second bias voltage.

According to the first aspect or any one of the foregoing implementations, in a fourth possible implementation of the first aspect, the RF part is coupled to both the analog-to-digital converter and the voltage controller, and the voltage generator is coupled to both the analog-to-digital converter and the voltage controller. The voltage controller includes a comparator and a first digital signal controller. In the adjustment mode, the comparator is configured to compare the single-ended reference signal and the second bias voltage to obtain a comparison result, and use the result as the difference. The first digital signal controller is configured to receive the difference from the comparator, and generate the control signal based on the difference. Optionally, the comparator is generally an analog component, and implements comparison in an analog domain to generate the difference, so as to reduce complexity of processing a digital signal by a rear end. Optionally, the single-ended reference signal is the first bias signal.

According to the first aspect or any one of the foregoing implementations, in a fifth possible implementation of the first aspect, the RF part is coupled to the voltage controller by using the analog-to-digital converter, the voltage generator is coupled to the voltage controller by using the analog-to-digital converter, and the voltage controller includes a second digital signal controller. In the adjustment mode, the analog-to-digital converter is configured to convert a deviation between the single-ended reference signal and the second bias voltage to a digital deviation; and the second digital signal controller is configured to estimate the difference according to the digital deviation, and generate the control signal based on the difference. In this technical solution, the analog-to-digital converter directly converts the deviation between the single-ended reference signal and the second bias voltage to the digital deviation, so that the second digital signal controller estimates the difference subsequently. In the estimation process, an additional comparator or analog component is not required. Optionally, the single-ended reference signal is a sine signal. The sine signal uses the first bias voltage as a direct-current signal, large signal, or a common-mode signal. Optionally, the second digital signal controller is a digital signal processor (DSP).

According to the fifth possible implementation of the first aspect, optionally, the second digital signal controller is specifically configured to: perform Fast Fourier Transform (FFT) on the digital deviation to obtain a frequency-domain deviation value, estimate the difference based on the frequency-domain deviation, and generate the control signal based on the difference.

According to the first or second possible implementation of the first aspect, in a sixth possible implementation of the first aspect, when the first bias voltage is greater than the second bias voltage, the control signal is used to decrease the first bias voltage; or when the first bias voltage is less than the second bias voltage, the control signal is used to increase the first bias voltage.

According to the third possible implementation of the first aspect, in a seventh possible implementation of the first aspect, when the first bias voltage is greater than the second bias voltage, the control signal is used to increase the second bias voltage; or when the first bias voltage is less than the second bias voltage, the control signal is used to decrease the second bias voltage.

According to any one of the fourth to the seventh possible implementations of the first aspect, in an eighth possible implementation of the first aspect, the communications apparatus further includes a register, coupled to the voltage controller and configured to temporarily store the control signal. In this technical solution, after the first digital signal controller or the second digital signal controller generates the control signal, the control signal may be temporarily stored, so as to read the corresponding control signal from the register subsequently.

According to the first aspect or any one of the foregoing implementations, in a ninth possible implementation of the first aspect, the RF part is integrated into a first semiconductor chip, the analog-to-digital converter, the digital baseband communications processor, the voltage controller, and the voltage generator are integrated into a second semiconductor chip, and the first semiconductor chip is coupled to the second semiconductor chip by using a single-ended transmission line. In the adjustment mode, the single-ended transmission line is configured to transmit the single-ended reference signal. In the operation mode, the single-ended transmission line is configured to transmit the single-ended analog baseband signal. Generally, rear-end baseband signal processing components for baseband processing, such as the analog-to-digital converter, the digital baseband communications processor, the voltage controller, and the voltage generator, and the front-end RF part for RF processing are integrated into different chips. This helps reduce chip manufacturing and implementation complexity. Optionally, in this technical solution, a chip is a circuit entity integrated onto a semiconductor substrate by using an integrated-circuit production technology. Optionally, the second semiconductor chip may be a baseband processor.

According to the first aspect or any one of the foregoing implementations, in a tenth possible implementation of the first aspect, the communications apparatus further includes an antenna and a radio frequency front-end (RFFE) component. The antenna is configured to receive the RF signal. The radio frequency front-end component is configured to receive the RF signal from the antenna, and couple the RF signal to the RF part. Optionally, the radio frequency front-end component may include a duplexer, configured to receive the RF signal from the antenna, so as to couple the RF signal to the rear-end RF part.

According to the first aspect or any one of the foregoing implementations, in an eleventh possible implementation of the first aspect, the adjustment mode continues for a preset time or a preset quantity of periods; and within the preset time or the preset quantity of periods, the voltage controller adjusts the first bias voltage or the second bias voltage for multiple times by using the control signal, to decrease the difference. In this technical solution, the adjustment may be iterated for multiple times within a specified time, to achieve a better adjustment effect. Optionally, the preset time or the preset quantity of periods may be set according to experience of a person skilled in the art. A longer time or a larger quantity of periods indicates a better convergence effect during iteration.

According to the first aspect or any one of the foregoing implementations, in an alternative implementation of the eleventh possible implementation of the first aspect, in the adjustment mode, the adjustment is performed by the communications apparatus for multiple times until the difference is less than a preset threshold. Optionally, the voltage controller may perform the adjustment for multiple times and stop the adjustment when the difference reaches the preset threshold.

According to the first aspect or any one of the foregoing implementations, optionally, the digital baseband communications processor includes a DSP or a CPU (Central Processing Unit). Further, optionally, the communications apparatus may further include a memory, configured to store wireless communications protocol software. The digital baseband communications processor is configured to read the wireless communications protocol software from the memory, and demodulate the digital baseband signal in the operation mode after being driven by the wireless communications protocol software. Further, the wireless communications protocol software complies with or supports one or more of an LTE protocol, a GSM protocol, a Universal Mobile Telecommunications System (UMTS) protocol, a Worldwide Interoperability for Microwave Access (Wi-MAX) protocol, a WCDMA protocol, a TDS-CDMA protocol, or a CDMA2000 protocol. Optionally, the communications apparatus may be a wireless base station or a wireless terminal. The CPU includes but is not limited to an ARM (advanced reduced instruction set computer machine) core.

According to the first aspect or any one of the foregoing implementations, optionally, the communications apparatus may be further a device that supports short-distance wireless communication. The device may comply with or support, including but not limited to, one or more protocols such as a WiFi (Wireless Fidelity) protocol, a Bluetooth protocol, an infrared protocol, or an NFC (near field communication) protocol.

According to the first aspect or any one of the foregoing implementations, optionally, the adjustment mode is applied to a communications apparatus production, debugging, or testing process.

According to the first aspect or any one of the foregoing implementations, optionally, in the operation mode, the communications apparatus is configured to: receive an RF signal, perform down-conversion on the RF signal to obtain a single-ended analog baseband signal, and demodulate the single-ended analog baseband signal based on the wireless communications protocol. In the adjustment mode, the communications apparatus is configured to adjust the bias voltage input into the analog-to-digital converter. Optionally, adjustment of the bias voltage is also referred to as common-mode voltage adjustment, large-signal adjustment, direct-current signal adjustment, direct-current operation state adjustment, or direct-current operation point adjustment.

According to a second aspect, an embodiment of the present disclosure provides a method for performing communication by a bias-voltage-adjustable communications apparatus, where the communications apparatus is capable of working in an adjustment mode and an operation mode, and the method includes: in the adjustment mode, generating a single-ended reference signal, where the single-ended reference signal includes a first bias voltage; generating a second bias voltage; and obtaining a difference between the first bias voltage and the second bias voltage, and generating a control signal based on the difference, where the control signal is used to adjust the first bias voltage or the second bias voltage to decrease the difference; and in the operation mode, receiving a radio frequency RF signal, and performing down-conversion on the RF signal to convert the RF signal to a single-ended analog baseband signal, where the single-ended analog baseband signal includes the first bias voltage; generating the second bias voltage; converting the single-ended analog baseband signal to a digital baseband signal under an action of the second bias voltage; and demodulating the digital baseband signal. The method is corresponding to the communications apparatus described in the first aspect, and achieves a similar beneficial effect.

According to the second aspect, in a first possible implementation of the second aspect, in the adjustment mode, the generating a single-ended reference signal includes: receiving a differential reference signal, and generating the single-ended reference signal; and after the generating a control signal based on the difference, the method further includes: adjusting the first bias voltage of the single-ended reference signal under an action of the control signal. In the adjustment mode, the second bias voltage is stable, and the first bias voltage is adjusted or changed. In the operation mode, both the first bias voltage and the second bias voltage are stable, ensuring that a circuit works properly.

According to the first possible implementation of the second aspect, in a second possible implementation of the second aspect, in the operation mode, the receiving an RF signal, and converting the RF signal to a single-ended analog baseband signal, in the operation mode, includes: receiving the RF signal, and converting the RF signal to an in-phase I analog baseband signal and a quadrature Q analog baseband signal that are orthogonal to each other; and receiving the I analog baseband signal and the Q analog baseband signal, and generating the single-ended analog baseband signal.

According to the second aspect, in a third possible implementation of the second aspect, in the adjustment mode, after the generating a control signal based on the difference, the method further includes: adjusting the second bias voltage under an action of the control signal. In the adjustment mode, the first bias voltage is stable, and the second bias voltage is adjusted or changed. In the operation mode, both the first bias voltage and the second bias voltage are stable, ensuring that a circuit works properly.

According to the second aspect or any one of the foregoing implementations of the second aspect, in a fourth possible implementation of the second aspect, the obtaining a difference between the first bias voltage and the second bias voltage includes: comparing, by a comparator, the single-ended reference signal and the second bias voltage, to obtain a comparison result, and using the result as the difference; or converting a deviation between the single-ended reference signal and the second bias voltage to a digital deviation, and estimating the difference according to the digital deviation.

Optionally, when the comparator is used to compare the single-ended reference signal and the second bias voltage to obtain the comparison result, and the comparison result is used as the difference, the single-ended reference signal is the first bias signal. When the deviation between the single-ended reference signal and the second bias voltage is converted to the digital deviation, and the difference is estimated according to the digital deviation, the single-ended reference signal is a sine signal.

According to the second aspect or any one of the foregoing implementations of the second aspect, in a fifth possible implementation of the second aspect, the adjustment mode continues for a preset time or a preset quantity of periods; and the control signal is used to adjust the first bias voltage or the second bias voltage for multiple times within the preset time or the preset quantity of periods, to decrease the difference.

According to the first aspect or any one of the foregoing implementations, in an alternative implementation of the fifth possible implementation of the second aspect, in the adjustment mode, the adjustment is performed by the communications apparatus for multiple times until the difference is less than a preset threshold. For example, the adjustment may be performed for multiple times and the adjustment stops when the difference reaches the preset threshold.

According to the second aspect or any one of the foregoing implementations of the second aspect, in a sixth possible implementation of the second aspect, the method is executed by a base station or a wireless terminal.

According to the first or second possible implementation of the second aspect, in a seventh possible implementation of the second aspect, when the first bias voltage is greater than the second bias voltage, the control signal is used to decrease the first bias voltage; or when the first bias voltage is less than the second bias voltage, the control signal is used to increase the first bias voltage.

According to the third possible implementation of the second aspect, in an eighth possible implementation of the second aspect, when the first bias voltage is greater than the second bias voltage, the control signal is used to increase the second bias voltage; or when the first bias voltage is less than the second bias voltage, the control signal is used to decrease the second bias voltage.

According to the second aspect or any one of the foregoing implementations of the second aspect, optionally, the demodulating the digital baseband signal includes: demodulating the digital baseband signal under a driving action of wireless communications protocol software. Further, the wireless communications protocol software complies with or supports one or more of an LTE protocol, a GSM protocol, a Universal Mobile Telecommunications System (UMTS) protocol, a Worldwide Interoperability for Microwave Access (WiMAX) protocol, a WCDMA protocol, a TDS-CDMA protocol, or a CDMA2000 protocol; or the wireless communications protocol software may further comply with or support one or more of short-distance wireless communications protocols such as a WiFi (Wireless Fidelity) protocol, a Bluetooth protocol, an infrared protocol, or an NFC (Near Field Communication) protocol.

According to the second aspect or any one of the foregoing implementations of the second aspect, optionally, the adjustment mode is applied to a communications apparatus production, debugging, or testing process.

According to the second aspect or any one of the foregoing implementations of the second aspect, optionally, in the operation mode, the communications apparatus is configured to: receive an RF signal, perform down-conversion on the RF signal to obtain a single-ended analog baseband signal, and demodulate the single-ended analog baseband signal based on the wireless communications protocol. In the adjustment mode, the communications apparatus is configured to adjust the bias voltage input into the analog-to-digital converter. Optionally, adjustment of the bias voltage is also referred to as common-mode voltage adjustment, large-signal adjustment, direct-current signal adjustment, direct-current operation state adjustment, or direct-current operation point adjustment.

BRIEF DESCRIPTION OF THE DRAWINGS

To describe the technical solutions in the embodiments of the present disclosure more clearly, the following briefly describes the accompanying drawings required for describing the embodiments or the prior art. Apparently, the accompanying drawings in the following description are merely schematic diagrams of some embodiments of the present disclosure or the prior art, and a person of ordinary skill in the art may still derive other drawings from these accompanying drawings without creative efforts.

DETAILED DESCRIPTION

Figure 1:
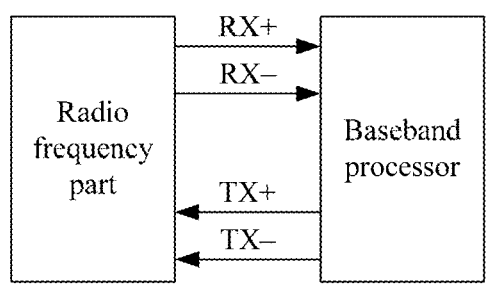
FIG. 1 is a simplified schematic diagram of a differential analog baseband signal transmission manner of a communications apparatus according to the prior art.
Figure 2:
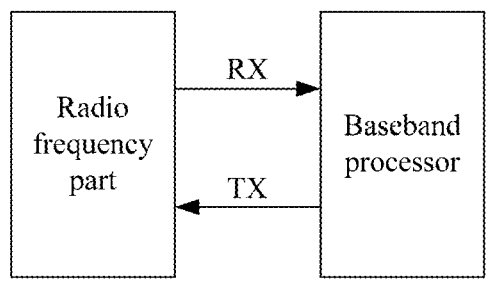
FIG. 2 is a simplified schematic diagram of a single-ended analog baseband signal transmission manner of a communications apparatus according to the prior art.
Figure 3:
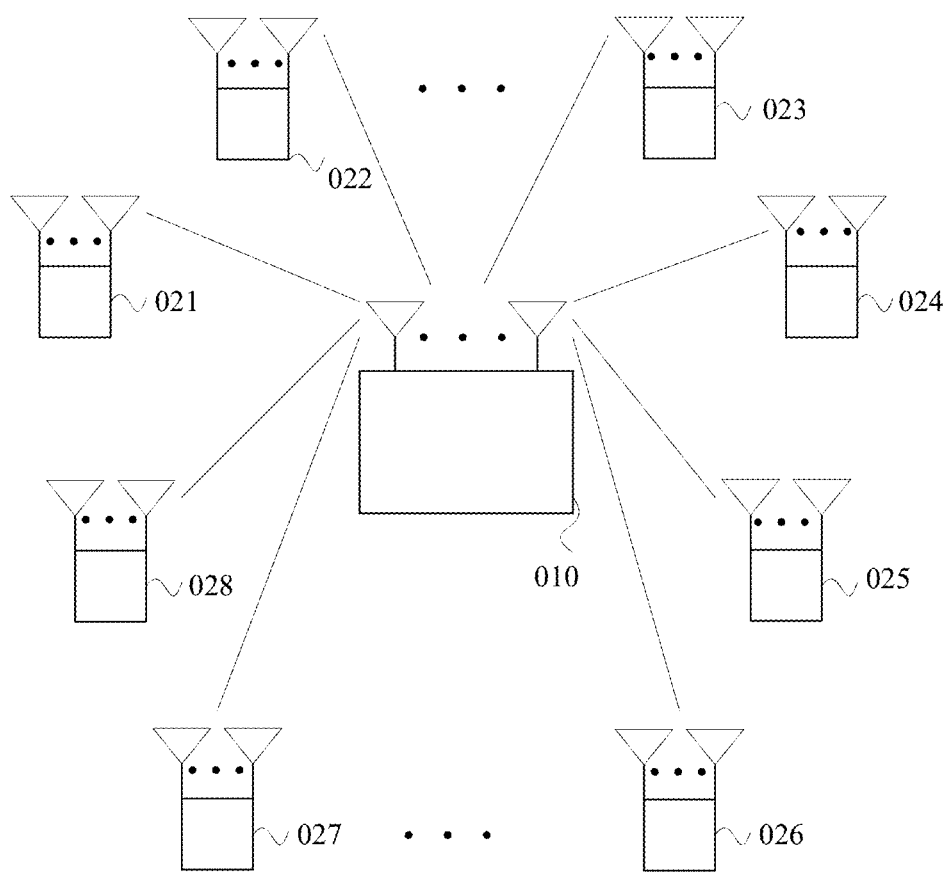
FIG. 3 is a schematic diagram of an application scenario of a wireless communications system according to an embodiment of the present disclosure.

FIG. 3 shows a typical application scenario of a wireless communications system. In FIG. 3, a base station 010 serves one or more communications cells, and provides a communications service for multiple wireless terminals 021 to 028 by using the one or more cells. Any one of the wireless terminals 021 to 028 may include at least one antenna, and communicate with the base station 010 by using the antenna. The wireless terminal may also be referred to as user equipment, a mobile station, a remote station, or a user terminal, and may use a wireless access service of the base station 010. A specific form of the wireless terminal may be user equipment such as a mobile phone, a tablet computer, or a personal digital assistant. The base station 010 may be an eNodeB or a NodeB in LTE, or may be an access point used by a base station controller or the like to connect the wireless terminals 021 to 028 to a mobile communications network. Any cell that is formed when the base station 010 provides an access service for the wireless terminals 021 to 028 may cover a geographical area, and occupy a carrier or frequency band in a frequency domain. Specifically, any one of the wireless terminals 021 to 028 and the base station 010 may use a wireless communications protocol to implement a communication process. The wireless communications protocol includes but is not limited to one or more of various cellular wireless communications protocols such as an LTE protocol, a GSM protocol, a UMTS protocol, a WiMAX protocol, a WCDMA protocol, a TDS-CDMA protocol, or a CDMA2000 protocol. In the embodiments of the present disclosure, LTE communication is a typical application scenario. It can be understood that one wireless terminal may generally support more of the foregoing wireless communications protocols, that is, support multimode. The communications apparatus in the embodiments of the present disclosure may be the base station 010 or any one of the wireless terminals 021 to 028 in FIG. 3.

Figure 4:
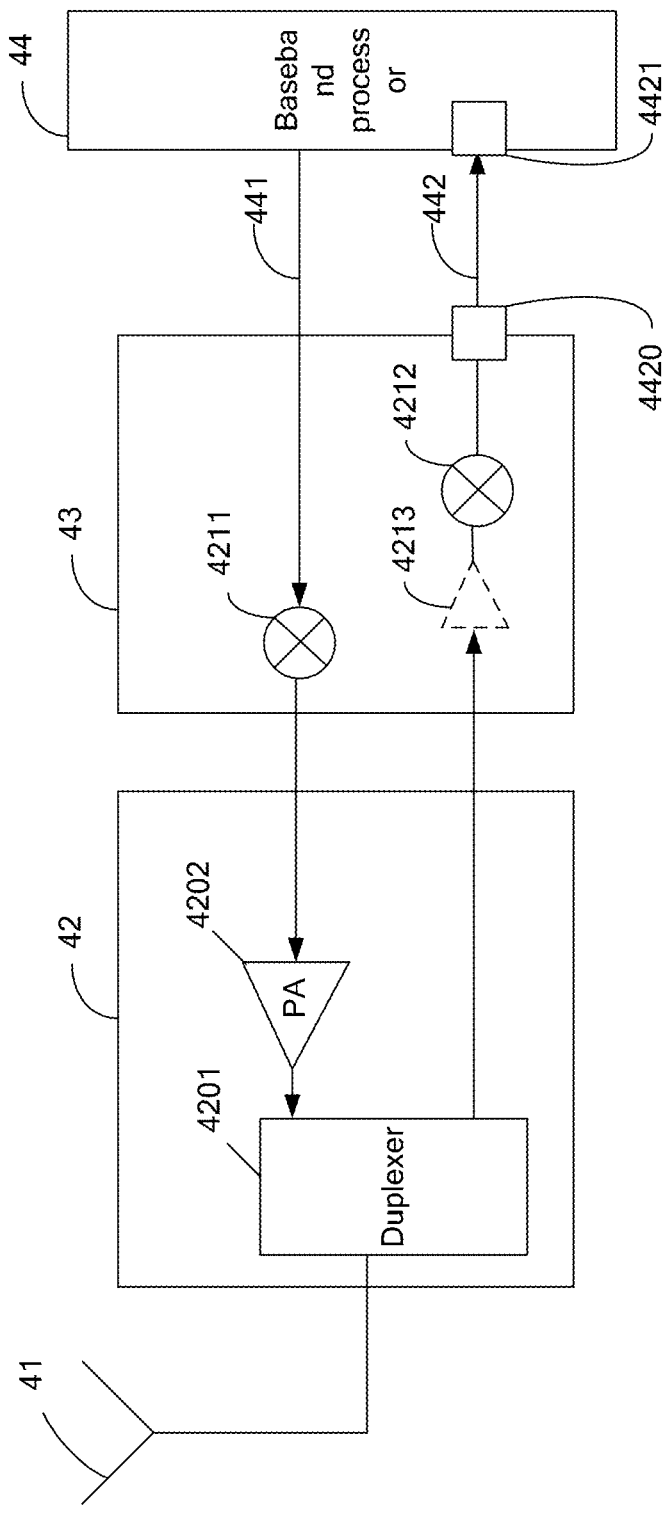
FIG. 4 is a simplified schematic diagram of an overall structure of a communications apparatus according to an embodiment of the present disclosure.

Specifically, FIG. 4 shows a structural diagram of an overall structure of the communications apparatus in an embodiment of the present disclosure. The communications apparatus includes an antenna 41, a radio frequency front-end component 42, an RF part 43, and a baseband processor 44. The baseband processor 44 is configured to: send an analog baseband signal to the RF part 43 by using a single-ended transmission line 441, so that the RF part 43 performs up-conversion on the analog baseband signal to obtain a to-be-sent RF signal; and receive, from the RF part 43 by using another single-ended transmission line 442, an analog baseband signal generated after down-conversion processing is performed on a received RF. During signal transmission, the baseband processor 44 is configured to modulate a baseband signal and convert a modulated signal to an analog baseband signal. During signal reception, the baseband processor 44 is configured to convert an analog baseband signal to a digital baseband signal, and demodulate the digital baseband signal to obtain a demodulation result. It can be understood that a baseband signal is a basic signal whose frequency starts from zero, and correspondingly, an RF signal may be a high-frequency signal that can be sent or received by an antenna. The baseband signal is further classified into an analog baseband signal and a digital baseband signal. After an RF signal is converted to an analog baseband signal, the analog baseband signal is further converted to a digital baseband signal. An analog baseband signal is an analog signal, and a digital baseband signal is a digital signal. The digital signal generally includes high logic ("1") and low logic ("0"). The analog signal has a specific signal value, and includes a direct-current large signal and a small signal that is superimposed on the large signal and that is used to reflect the specific signal value. This is further detailed in a subsequent embodiment. The RF signal may be considered as a high-frequency analog signal.

Referring to FIG. 4, the RF part 43 may include an up-converter 4211 and a down-converter 4212. The up-converter 4211 is configured to perform up-conversion on an analog baseband signal during signal transmission, to convert the analog baseband signal to a to-be-sent RF signal. The down-converter 4212 is configured to perform down-conversion on a received RF signal during signal reception, to convert the received RF signal to an analog baseband signal. The up-converter 4211 and the down-converter 4212 may be collectively referred to as a mixer, configured to implement conversion between an RF signal and an analog baseband signal. Further, the RF part 43 may further include a low-noise amplifier 4213, configured to amplify an RF signal from the radio frequency front-end component 42 when the communications receives a signal, so as to provide the amplified RF signal for the down-converter 4212.

In FIG. 4, the radio frequency front-end component 42 may include a duplexer 4201, configured to separate a to-be-sent RF signal and a received RF signal by means of filtering, and specifically configured to couple the RF signal received by the antenna 41 to the low-noise amplifier 4213 of the RF part 43, or couple the sent signal from the up-converter 4211 of the RF part 43 to the antenna 41. Optionally, the radio frequency front-end component 42 may further include a power amplifier (PA), configured to perform power amplification processing on the to-be-sent RF signal. The duplexer may be replaced by two separate filters, and this is not limited in this embodiment.

In FIG. 4, the RF part 43 and the baseband processor 44 may be implemented by using a chip technology. For example, the RF part 43 and the baseband processor 44 may be integrated into different semiconductor chips. Alternatively, the RF part 43 and the baseband processor 44 may be integrated into one semiconductor chip. Generally, the RF part 43 and the baseband processor 44 are integrated into different chips to help reduce chip manufacturing and implementation complexity. During signal reception, the RF part 43 is connected to a single-ended interface 4421 of the baseband processor 44 by using a single-ended interface 4420, to transmit an analog baseband signal. The single-ended interfaces help reduce device implementation costs and have a better cost advantage than a differential interface.

Figure 5:
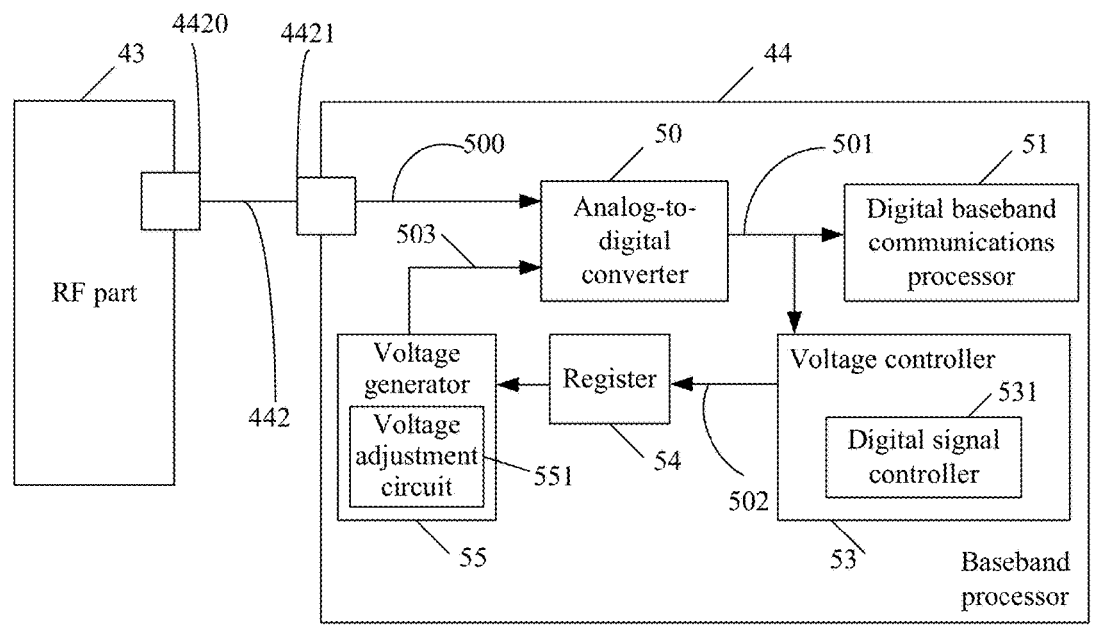
FIG. 5 is a simplified schematic diagram of a bias-voltage-adjustable communications apparatus according to an embodiment of the present disclosure.

To describe an implementation of the baseband processor 44 in FIG. 4 clearly, the following describes a communications apparatus with reference to FIG. 5. FIG. 5 further details the structure of the baseband processor 44 in the communications apparatus corresponding to FIG. 4. The baseband processor 44 specifically includes an analog-to-digital converter 50, a digital baseband communications processor 51, a voltage controller 53, a register 54, and a voltage generator 55. The communications apparatus may be in either an operation mode or an adjustment mode. In the operation mode, the communications apparatus normally receives an RF signal, and demodulates the RF signal by using a wireless communications protocol. In the adjustment mode, the communications apparatus is configured to adjust a bias voltage input into the analog-to-digital converter 50, that is, adjust a direct-current operation state or a direct-current operation point of the analog-to-digital converter 50.

The following provides an embodiment about how a communications apparatus works in the operation mode.

Figure 8:
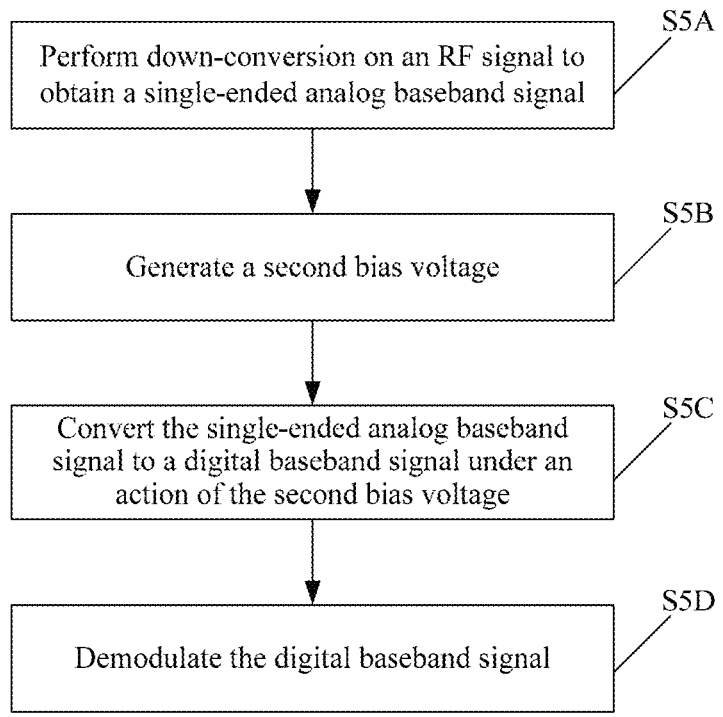
FIG. 8 is a simplified schematic flowchart of a method for a communications apparatus to work in an operation mode according to an embodiment of the present disclosure.

In the operation mode, the communications apparatus corresponding to FIG. 5 may execute a communication method shown in FIG. 8. Specifically, in step S5A, when receiving an RF signal, the RF part 43 performs down-conversion on the RF signal, to convert the RF signal to a single-ended analog baseband signal. The RF part 43 may further send the single-ended analog baseband signal 500 to the single-ended interface 4421 of the baseband processor 44 by using the single-ended interface 4420 of the RF part 43. The signal 500 is sent to the analog-to-digital converter 50 by using a single-ended transmission line 442. The single-ended transmission line 442 may be specifically a wire connected to different chips. In step S5B, the voltage generator 55 is configured to generate a second bias voltage 503. The second bias voltage 503 is transmitted to the analog-to-digital converter 50.

Figure 6:
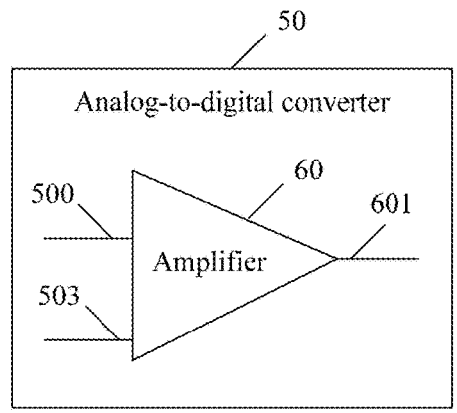
FIG. 6 is a simplified schematic diagram of an amplifier applied to an analog-to-digital converter in a communications apparatus according to an embodiment of the present disclosure.

Referring to FIG. 5 and FIG. 8, further, in step S5C, the analog-to-digital converter 50 is configured to perform analog-to-digital conversion on the single-ended analog baseband signal 500 under an action of the second bias voltage 503 to obtain a digital baseband signal 501. Specifically, the analog-to-digital converter 50 may be any one of a Flash ADC, a pipelined ADC, or a sigma-delta (Σ-Δ) ADC. The single-ended analog baseband signal 500 includes a first bias voltage, and the second bias voltage 503 is considered as a reference voltage of the single-ended analog baseband signal 500. Specifically, the analog-to-digital converter 50 may include an amplifier 60, and the amplifier 60 may be considered as a comparator. FIG. 6 shows an embodiment of the amplifier 60 included in the analog-to-digital converter 50 in FIG. 5. A differential input end of the amplifier 60 receives both the single-ended analog baseband signal 500 and the second bias voltage 503, and the amplifier 60 is configured to compare values of the single-ended analog baseband signal 500 and the second bias voltage 503 to output a comparison result 601. The comparison result 601 is used to generate the digital baseband signal 501. A specific structure of the amplifier 60 and a connection relationship between the amplifier 60 and another component of the analog-to-digital converter 50 depend on a type of the analog-to-digital converter 50. For details of a structure of the analog-to-digital converter 50, refer to descriptions of an operation principle of an analog-to-digital converter in the prior art, and details are not repeated herein. Referring to FIG. 5 and FIG. 8, further, after the digital baseband signal 501 is transmitted to the digital baseband communications processor 51, in step SSD, the digital baseband communications processor 51 is configured to demodulate the digital baseband signal 501. Specifically, the digital baseband communications processor 51 may run wireless communications protocol software to demodulate the digital baseband signal 501. The demodulation operation includes but is not limited to one or more of operations such as channel estimation, channel decoding, signal de-interleaving, or signal demodulation. The wireless communications protocol software complies with or supports one or more of an LTE protocol, a GSM protocol, a UMTS protocol, a WiMAX protocol, a WCDMA protocol, a TDS-CDMA protocol, or a CDMA2000 protocol. The digital baseband communications processor 51 may include but is not limited to a DSP or a CPU. The CPU includes but is not limited to an ARM core. Further, the communications apparatus may further include a memory. The memory is not shown in FIG. 5. The memory may store the wireless communications protocol software, so that the digital baseband communications processor 51 reads the software from the memory and performs modulation or the demodulation after being driven by the software.

In the operation mode, when the received single-ended analog baseband signal 500 is demodulated, the second bias voltage 503 generated by the voltage generator 55 is stable and is considered as a reference voltage of the single-ended analog baseband signal 500 during analog-to-digital conversion. That is, the second bias voltage 503 is a large-signal voltage or may be referred to as a common-mode voltage or direct-current voltage. In the field of analog signals, an analog signal is generally a superimposition of a large signal and a small signal. The large signal is a direct-current signal and provides a bias voltage or common-mode voltage for a circuit to work. The small signal is a signal that actually reflects an actual value and a change status of the analog signal. The small signal is superimposed on the large small.

Figure 7:
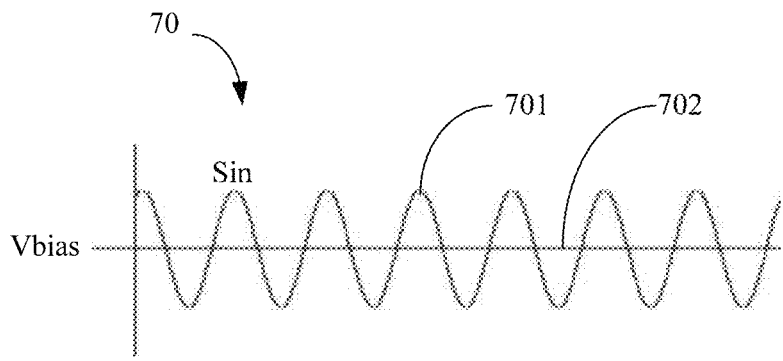
FIG. 7 is a simplified schematic diagram of an analog-domain sine signal including a large signal and a small signal according to an embodiment of the present disclosure.

For details, refer to FIG. 7. A sine signal 70 in FIG. 7 is also referred to as a monophonic signal. In this embodiment, the sine signal 70 shown in FIG. 7 is used as an example to describe a meaning of the bias voltage, direct-current signal, or common-mode voltage. A signal 702 is a direct-current signal. As a bias voltage, the signal 702 generally specifies a direct-current operation point or a direct-current operation state of an analog circuit. A value of the signal 702 may be Vbias in a unit of volt (V) or millivolt (mV). A value of a sine signal 701 superimposed on the direct-current signal 702 whose value is Vbias may be Sin and changes with a phase. The small signal 701 is a signal that actually reflects a change status of the analog signal 70. The large signal 702 and the small signal 701 jointly form the signal 70. Specifically, for the analog-to-digital converter 50 or the amplifier 60 of the analog-to-digital converter 50, there may be a difference between the first bias voltage of the received single-ended analog baseband signal 500 and the corresponding reference bias voltage, that is, the second bias voltage 503. In view of this, a bias voltage adjustment solution is provided in this embodiment, so that the communications apparatus not only can be in a procedure corresponding to the operation mode shown in FIG. 8, but also can be in an adjustment mode, that is, the bias voltage of the communications apparatus is adjustable.

The following provides an embodiment about how the communications apparatus works in the adjustment mode.

Figure 9:
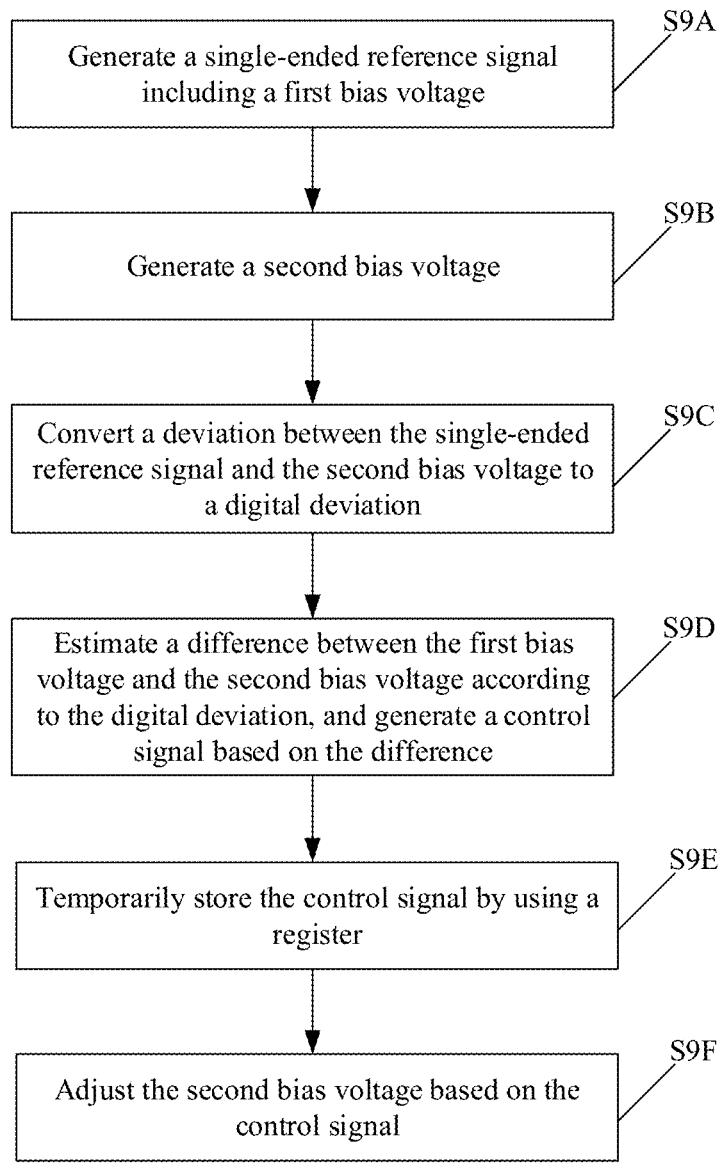
FIG. 9 is a simplified schematic flowchart of a method for a communications apparatus to work in an adjustment mode according to an embodiment of the present disclosure.

In the adjustment mode, an operation process of adjusting a bias voltage by the communications apparatus corresponding to FIG. 5 is shown in a flowchart in FIG. 9. When the communications apparatus works in the adjustment mode, a difference between the second bias voltage 503 and the first bias voltage generated by the RF part 43 can be decreased, so that it is less difficult to implement the analog-to-digital converter 50 or the amplifier 60 of the analog-to-digital converter 50. Specifically, in step S9A, the RF part 43 is configured to generate a single-ended reference signal 500. Similar to a single-ended analog baseband signal 500, the single-ended reference signal 500 also includes the first bias voltage. The RF part 43 generates the single-ended reference signal 500 in the adjustment mode to replace the single-ended analog baseband signal 500 generated by the RF part 43 in the operation mode, so that the single-ended reference signal 500 is used to perform an adjustment process. A typical example of the single-ended reference signal is the sine signal 70 that is shown in FIG. 7 and that includes the first bias signal 702 and the small signal 701. It may be understood that the single-ended reference signal 500 may be the sine signal 70, or may be a signal in another form, for example, a triangular wave signal. The sine signal is merely an example. All types of analog signals have a similar large signal working principle and a similar small signal working principle, which are not described herein.

Although the reference signal 500 generated by the RF part 43 in the adjustment mode is different from the single-ended analog baseband signal 500 generated by the RF part 43 in the operation mode, a large signal or a direct-current signal of the reference signal 500 is the same as that of the single-ended analog baseband signal 500, that is, the first bias signal remains unchanged in the two modes. As described above, a small signal of an analog circuit actually reflects an actual signal change of the analog circuit, and a large signal provides only a direct-current operation point or direct-current operation state for the analog circuit, or is only used to establish a direct-current operation point or direct-current operation state for the analog circuit, and does not change with a change of a working mode. Therefore, regardless of the operation mode or the adjustment mode, a direct-current voltage or a common-mode voltage of a signal transmitted by the RF part 43 to the baseband processor 44, that is, the first bias voltage, remains unchanged. The baseband processor 44 needs to adjust only a direct-current operation state of the analog circuit in the adjustment mode to change a direct-current bias voltage, and when the communications apparatus enters the operation mode, an adjusted value of the first bias voltage remains unchanged. This solution is specifically implemented by adjusting a direct-current bias voltage of the analog-to-digital converter 50. In the adjustment mode, adjustment of the bias voltage is also referred to as common-mode voltage adjustment, large-signal adjustment, direct-current signal adjustment, direct-current operation state adjustment, or direct-current operation point adjustment.

With reference to the schematic diagram of the apparatus in FIG. 5 and the flowchart of the adjustment method in FIG. 9, further, in step S9B, the voltage generator 55 is configured to generate a second bias voltage. The second bias voltage is used to provide a reference common-mode voltage for the analog-to-digital converter 50. In step S9C, the analog-to-digital converter 50 is configured to convert an analog deviation value between the single-ended reference signal 500 and the second bias voltage to a digital deviation 501. That is, the analog-to-digital converter 50 compares the single-ended reference signal 500 and the second bias voltage and generates the digital signal 501 according to a comparison result. The digital signal 501 is different from the digital baseband signal 501 in the operation mode. The digital signal 501 is used to reflect a digital quantization result of a deviation between the single-ended reference signal 500 and the second bias voltage. In step S9D, a digital signal controller 531 included in the voltage controller 53 is configured to estimate a difference between the first bias voltage and the second bias voltage according to the digital deviation 501, and generate the control signal 502 based on the difference. Specifically, the digital signal controller 531 may perform FFT processing on the digital deviation 501 to obtain a frequency-domain deviation value, estimate the difference based on the frequency-domain deviation value, and generate the control signal 502 based on the difference. In this embodiment, the digital signal controller 531 may transform a deviation between the sine signal and a reference bias voltage into a frequency-domain value by means of FFT transform, and estimate a difference between a direct-current component of the sine signal and the reference bias voltage based on the frequency-domain value. This is a typical method for estimating a direct-current deviation in this field. For a specific algorithm, refer to a prior-art algorithm, and details are not described in this embodiment. It may be understood, even if no FFT is performed, the digital signal controller 531 may directly perform estimation according to a time-domain digital deviation 501 to obtain the difference. These algorithms belong to a known technology, and details are not described herein.

Regarding FIG. 9 and FIG. 5, further, in step S9E, the control signal 502 from the voltage controller 53 may be further temporarily stored in a register 54. Due to the register 54, a time sequence of the digital signal controller 531 does not need to be strictly controlled. An output result of the digital signal controller 531 may be directly stored in the register and is to be read by a voltage generator 55. Therefore, time sequence design complexity can be reduced. In step S9F, the voltage generator 55 reads the control signal 502 from the register 54, and adjusts, based on the control signal 502, the second bias voltage generated by the voltage generator 55. Specifically, the voltage generator 55 may include a voltage adjustment circuit 551, and is specifically configured to generate the second bias voltage and implement the adjustment function in step S9F.

In the adjustment mode, optionally, the difference between the second bias voltage 503 and the first bias voltage may be represented as a serial digital sequence signal. The control signal 502 may be the digital sequence signal itself or a digital signal obtained after the digital sequence signal is transformed. The control signal 502 is provided to the register 54, and is finally received by the voltage adjustment circuit 551 of the voltage generator 55. For example, the first bias voltage Vbias included in the single-ended reference signal 500 is set to 0.75 V. Assuming that the second bias voltage 503 is the same as the first bias voltage of the single-ended reference signal 500 in an ideal state, the difference that is estimated by the digital signal controller 531 according to the result output by the analog-to-digital converter 50 should be 000000000000. However, actually, the second bias voltage 503 is unequal to the first bias voltage, for example, less than 0.75 V, and an actually estimated difference is 000000000011, that is, the difference in decimal notation is 3, indicating that the first bias voltage is greater than the second bias voltage 503 and a difference between the first bias voltage and the second bias voltage 503 is 3. The difference is a serial digital sequence signal that is referred to as a serial signal for short. The difference may be directly used as the control signal 502, or may be transformed to obtain the control signal 502. By means of the transformation, the control signal 502 can be identified by the voltage adjustment circuit 551. For example, the transformation may be converting the difference in binary notation to a form of a Gray code or a thermometer code. No limitation is imposed on a specific form of the control signal in this embodiment. After the control signal 502 is received by the voltage adjustment circuit 551, a value of the second bias voltage 503 may be directly increased based on the control signal 502. Generally, the increase means that one preset step size, for example, 0.1 V, is added on a basis of a current value of the second bias voltage 503, to decrease the difference. On the contrary, if the difference shows that the second bias voltage 503 is greater than the first bias voltage, the adjustment is used to decrease the second bias voltage 503, for example, to decrease the preset step size, and details are not described herein. The adjustment step size may be a fixed value, for example, 0.1 V mentioned above, or may be a product of the second bias voltage 503 and a preset factor. For example, when the factor is 0.5, the second bias voltage 503 may increase or decrease by a half of the current value of the second bias voltage 503 during each adjustment. This adjustment method is referred to as a bisection method. Optionally, the control signal 502 may also specifically indicate a value of the adjustment step size. The value is estimated by the voltage adjustment circuit 551 on a basis of the difference. When the difference is greater, the adjustment step size indicated by the generated control signal 502 is larger, so as to decrease the difference.

It may be understood that minimizing the difference between the second bias voltage 503 and the first bias voltage helps further reduce difficulty in designing the analog-to-digital converter 50. Therefore, the adjustment mode may be performed for multiple times, and generally continues for a preset time or a preset quantity of periods.

The adjustment does not stop within the preset time or a preset quantity of periods. Therefore, a timer may be disposed in the voltage controller 53 or in the baseband processor 44. The timer is not shown in FIG. 5. After the adjustment mode is entered, the timer starts timing. After a preset quantity of periods or a preset time, the timer expires, and this triggers exiting from the adjustment mode. It may be understood that a larger step size used during adjustment indicates faster convergence during adjustment, that is, an adjustment effect can be achieved within a shorter time. A specific adjustment method may alternatively be another alternative means, for example, when to exit the adjustment mode is set based on the determined difference, instead of a time or a period. The voltage controller 53 can stop the adjustment when determining that the difference obtained by the voltage controller 53 is less than a preset threshold. The threshold may be set by a person skilled in the art according to experience or an experience result.

Figure 10A:
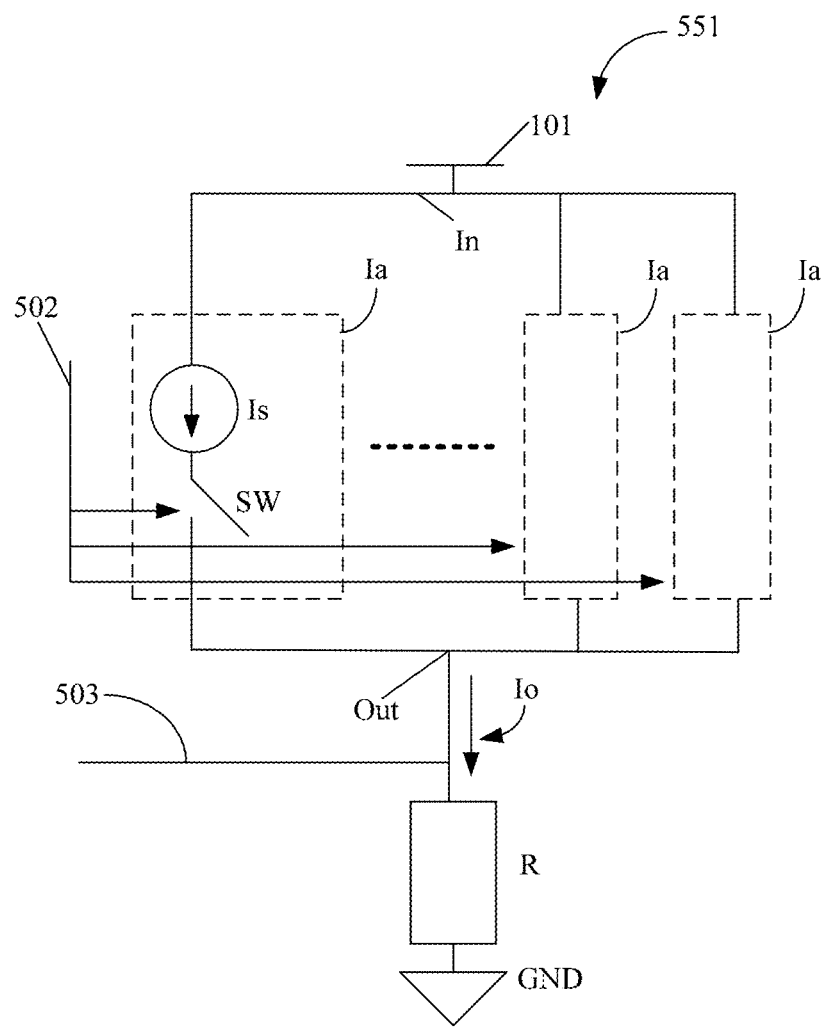
FIG. 10A is a simplified schematic diagram of a voltage adjustment circuit according to an embodiment of the present disclosure.

In the embodiment corresponding to FIG. 5, the voltage adjustment circuit 551 may be implemented by using various devices that implement voltage adjustment. This embodiment provides only an example for description in the following. FIG. 10A shows a typical structure of the voltage adjustment circuit 551 in FIG. 5. The voltage adjustment circuit 551 performs adjustment in a form of an adjustable current and includes an input end In coupled to a first power line 101, multiple adjustable current sources Ia connected in parallel that are coupled to the input end In, a first output end Out that is coupled to the multiple adjustable current sources Ia connected in parallel and that is configured to output an adjustable current Io, and a first resistor R that is configured to receive the adjustable current Io, is coupled to a ground line GND, and generates the direct-current second bias voltage 503. Each adjustable current source Ia includes a current source Is and a first switch SW that are connected in serial to each other. In FIG. 10A, an internal structure of only one adjustable current source Ia is specifically drawn as an example. The control signal 502 is used to control a turn-on or turn-off state of multiple first switches SW to adjust a value of the adjustable current Io, so as to adjust the second bias voltage 503. In FIG. 10A, a current source Is included in each adjustable current source Ia is configured to output currents whose values are equal. If the control signal 502 is a serial signal, the control signal 502 may be transformed by a circuit component of the voltage adjustment circuit 551 into multiple independent signals. The multiple independent signals are used to control switches SW in all adjustable current sources Ia respectively, so that the switches SW may be turned on or off, and each adjustable current source Ia is enabled or disabled. It may be understood that when a larger quantity adjustable current sources Ia are enabled, a larger adjustable current Io is output, and a larger second bias voltage 503 is generated. The second bias voltage 503 may be increased by enabling more adjustable current sources Ia by using the control signal 502; vice versa. It may be understood that locations of the switch SW and the current source Is in each adjustable current source Ia in FIG. 10A that are connected in serial are interchangeable, and a circuit operation is not affected.

Figure 10B:
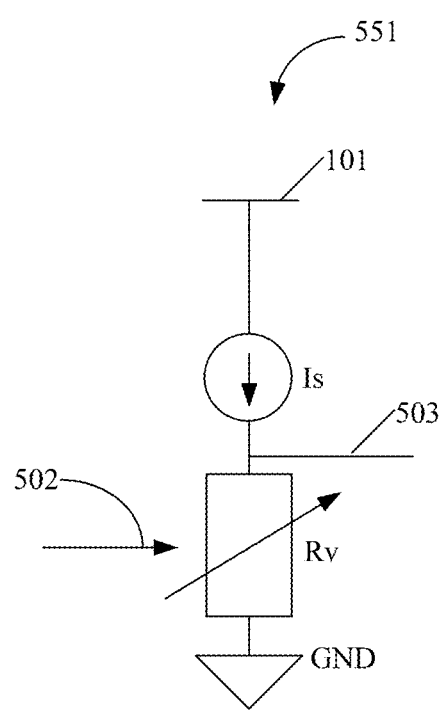
FIG. 10B is a simplified schematic diagram of another voltage adjustment circuit according to an embodiment of the present disclosure.
Figure 10C:
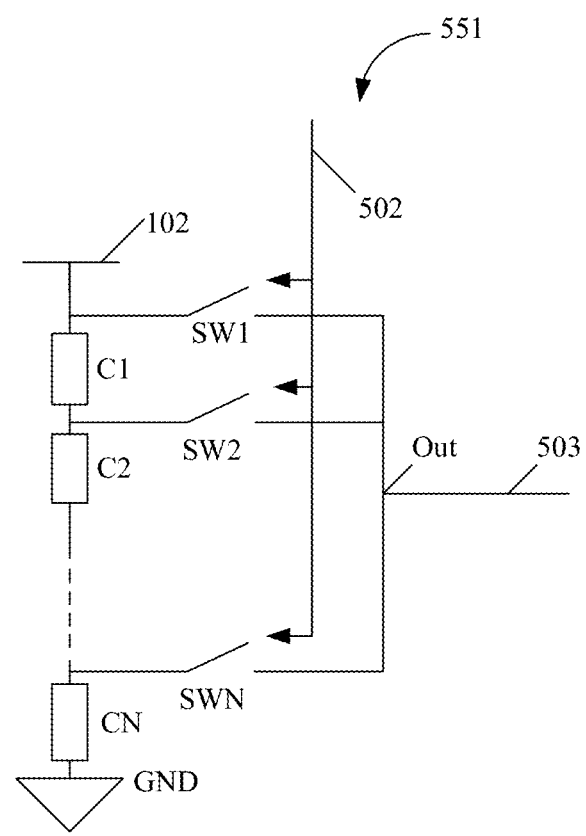
FIG. 10C is a simplified schematic diagram of another voltage adjustment circuit according to an embodiment of the present disclosure.

FIG. 10B is an alternative solution of the voltage adjustment circuit 551 in FIG. 10A. In the solution, an adjustable resistor is used to perform adjustment. The voltage adjustment circuit 551 includes a constant current source Is that is coupled to a first power line 101 and that is configured to output a constant current, and a variable resistor Rv that is coupled to a ground line GND and that is configured to receive the constant current and generates the second bias voltage 503. The control signal 502 is used to control a value of the variable resistor Rv to adjust the second bias voltage 503. When the control signal instructs to increase the second bias voltage 503, the value of the variable resistor Rv is increased to increase the second bias voltage 503; vice versa. If the control signal 502 is serial signal, the control signal 502 may be transformed by a circuit component of the voltage adjustment circuit 551 into a signal whose variable resistor Rv can be identified. FIG. 10C is another alternative solution of the voltage adjustment circuit 551. In the solution, a voltage is divided by using a component to perform adjustment. The voltage adjustment circuit 55 includes: multiple voltage dividers C1 to CN connected in serial that are coupled between a second power line 102 and a ground line GND, where N is an integer greater than or equal to 2; multiple second switches SW1 to SWN coupled to the multiple voltage dividers C1 to CN connected in serial; and a second output end Out that is coupled to the multiple second switches SW1 to SWN and configured to output the second bias voltage 503. The control signal 502 is configured to control a turn-on or turn-off state of the multiple second switches SW1 and SWN to adjust the second bias voltage 503. If the control signal 502 is a serial signal, the control signal 502 may be transformed by a circuit component of the voltage adjustment circuit 551 into independent signals. The multiple independent signals are used to control the second switches respectively. At a time point, one of the multiple second switches SW1 to SWN is turned on, and other switches of second switches SW1 to SWN are turned off, so that the voltage adjustment circuit 551 outputs a corresponding divided voltage. For example, when the second switch SW1 is turned on, the other switches are turned off, a maximum second bias voltage 503, that is, a power voltage of the second power line 102, is output. A most common form of each of the voltage dividing components C1 to CN includes one resistor or multiple resistors connected in serial or in parallel. No limitation is imposed on a specific form of the voltage dividing component in this embodiment.

The communications apparatus may be in multiple other specific structures, with different means for an adjustment principle. This is not limited to FIG. 5 and FIG. 9. The following describes another possible embodiment.

Figure 11:
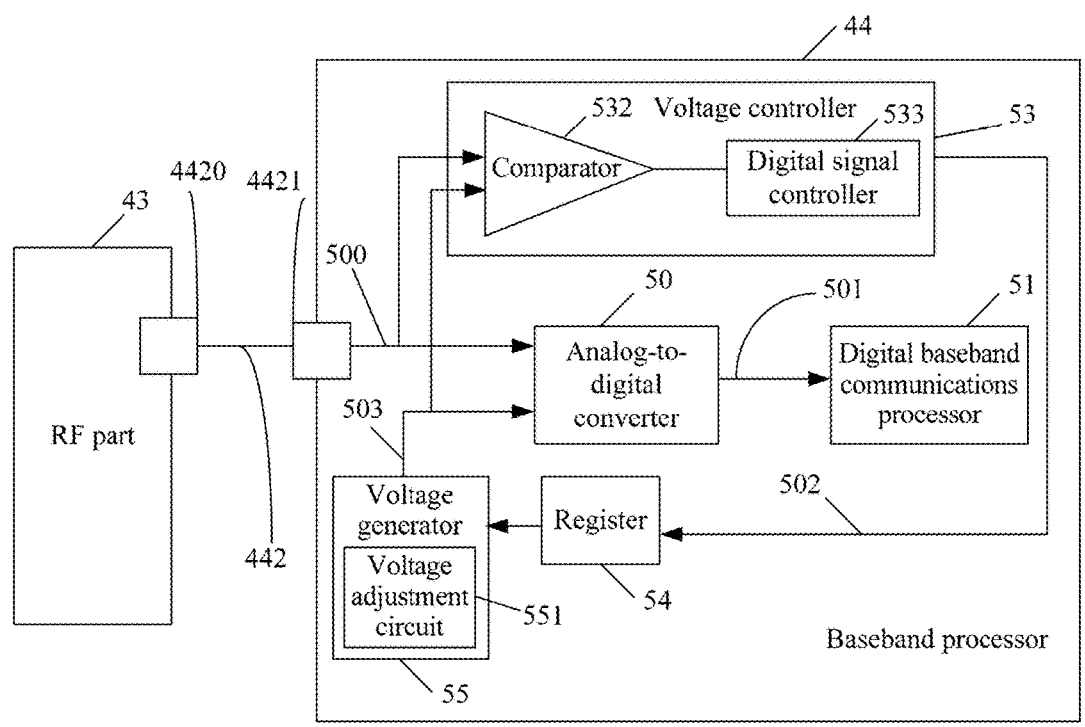
FIG. 11 is a simplified schematic diagram of another bias-voltage-adjustable communications apparatus according to an embodiment of the present disclosure.

As an alternative embodiment of FIG. 5, FIG. 11 is a schematic diagram of another communications apparatus according to an embodiment of the present disclosure. In an operation mode, an operation principle of the communications apparatus in FIG. 11 is the same as that of the apparatus corresponding to FIG. 5, and reference may be made to the descriptions in the embodiment corresponding to FIG. 5. In an adjustment mode, a greatest difference between the communications apparatus corresponding to FIG. 11 and the communications apparatus corresponding to FIG. 5 lies in that the voltage controller 53 no longer receives the digital deviation 501 output by the analog-to-digital converter 50, but directly receives the single-ended reference signal 500 and the second bias voltage 503 and generates a control signal by using a difference between the single-ended reference signal 500 and the second bias voltage 503. In the communications apparatus in FIG. 11, the voltage controller 53 may include a comparator 532 and a digital signal controller 533. In the adjustment mode, the comparator 532 is configured to compare the single-ended reference signal 500 and the second bias voltage 503 to obtain a comparison result, and use the result as the difference. In this case, the single-ended reference signal 500 is different from the sine signal used in the embodiment in FIG. 5, and may be a first bias voltage itself. The digital signal controller 533 is configured to receive the difference from the comparator 532, and generate the control signal based on the difference.

According to a technical solution corresponding to FIG. 11, in the adjustment mode, compared with the digital signal controller 531 in FIG. 5, the digital signal controller 533 skips a process of estimating a digital deviation in a digital domain, and directly compares the first bias voltage and second bias voltage 503 by using the comparator 53, to obtain the difference. This reduces digital signal processing complexity. On the contrary, in the technical solution corresponding to FIG. 5, the difference is calculated totally in the digital signal processing procedure, with no need to use the comparator 532 shown in FIG. 11. Except for the change of the voltage controller 53, the communications apparatus in FIG. 11 is similar to the apparatus in FIG. 5. For a specific operation principle of the communications apparatus, refer to the descriptions in the foregoing embodiment.

Figure 12:
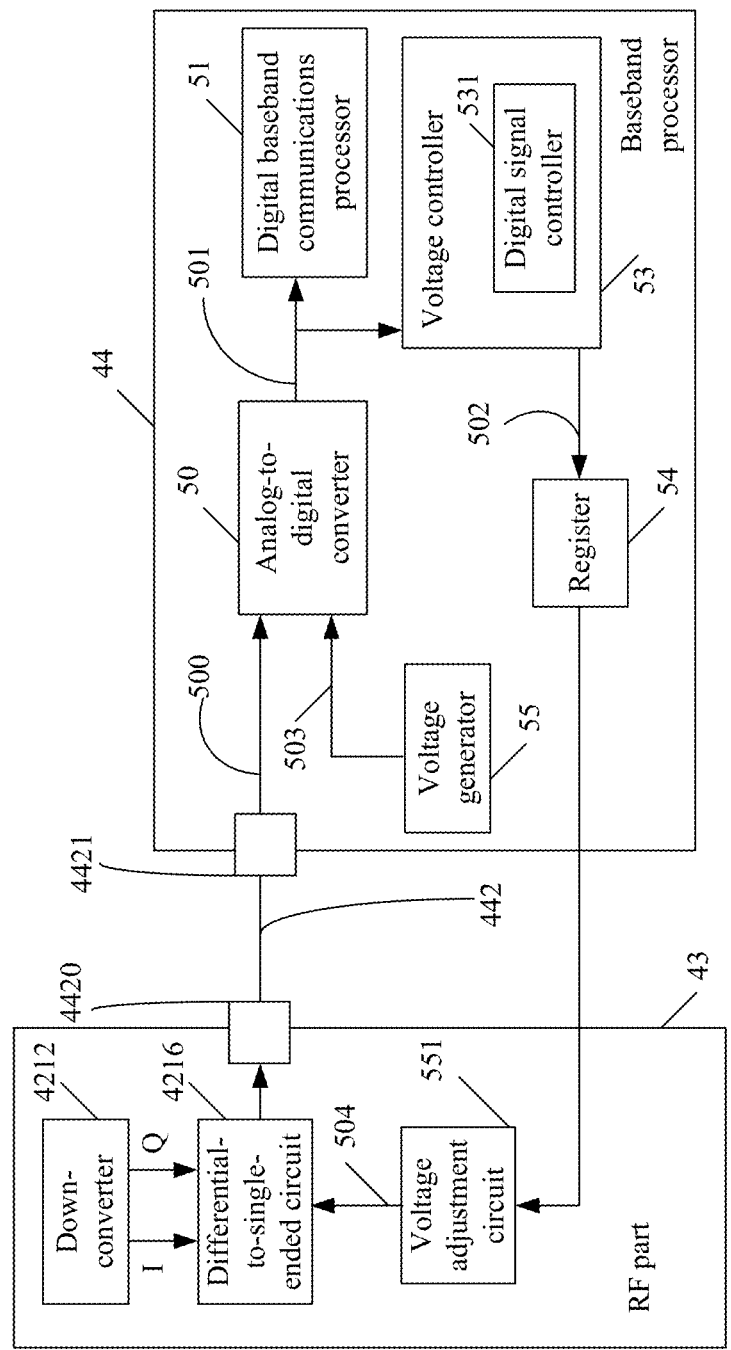
FIG. 12 is a simplified schematic diagram of another bias-voltage-adjustable communications apparatus according to an embodiment of the present disclosure.
Figure 13:
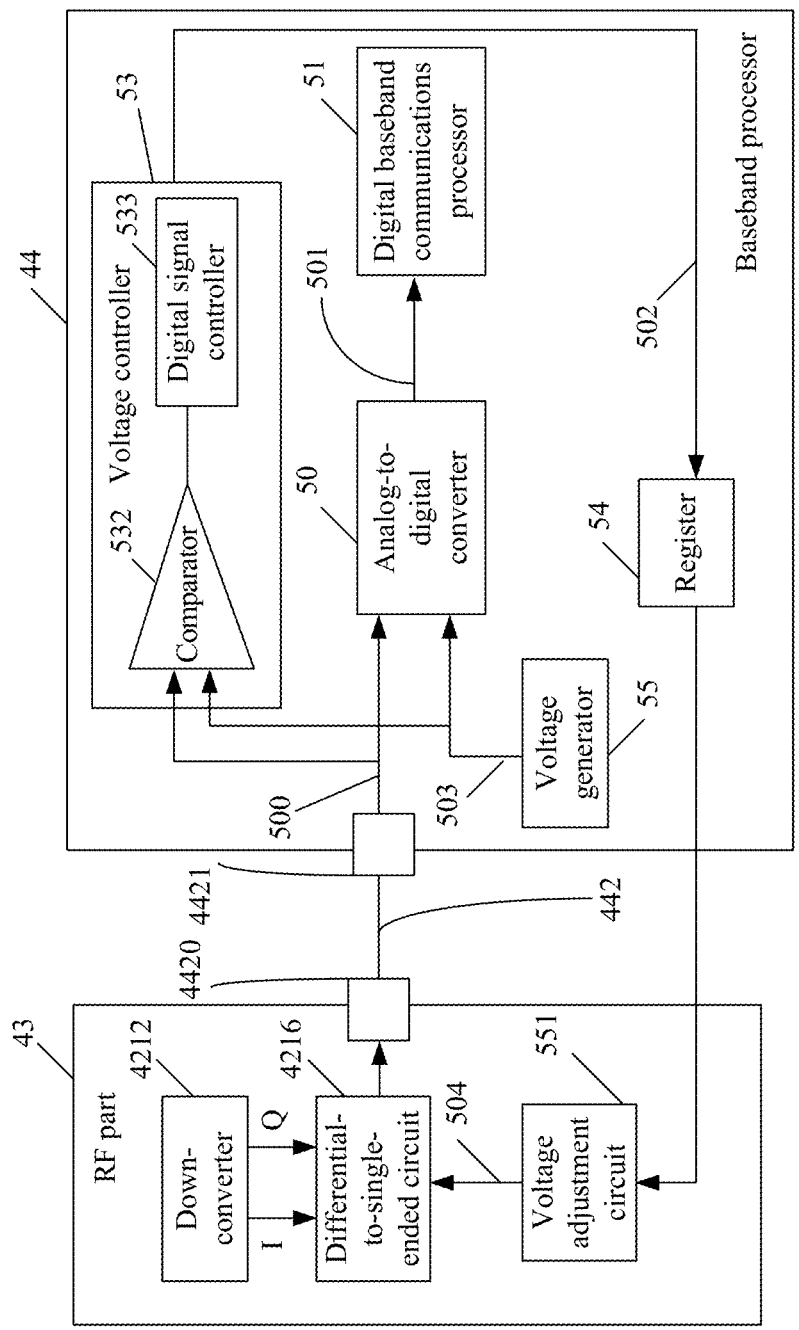
FIG. 13 is a simplified schematic diagram of another bias-voltage-adjustable communications apparatus according to an embodiment of the present disclosure.

Optionally, on a basis of FIG. 5 and FIG. 11, the embodiment of the present disclosure may be further transformed properly to provide another alternative technology solution. Specifically, as shown in FIG. 12 and FIG. 13, a function of the voltage adjustment circuit 551 is implemented within the RF part 43 instead of in the voltage generator 55. That is, in the adjustment mode, the control signal 502 generated by the voltage controller 53 in this case is not used to adjust the second bias voltage 503 output by the voltage generator 55, but is used to adjust a first bias voltage of the reference signal 500 within the RF part 43. However, a specific adjustment principle is similar to that in the foregoing embodiment. When the first bias voltage is greater than the second bias voltage 503, the control signal 502 generated by the voltage controller 53 is used to decrease the first bias voltage. When the first bias voltage is less than the second bias voltage 503, the control signal 502 generated by the voltage controller 53 is used to increase the first bias voltage.

Specifically, structures of most circuits in FIG. 12 are the same as those in FIG. 5. An operation principle of the communications apparatus in the operation mode in FIG. 12 is the same as that of the apparatus corresponding to FIG. 5 or FIG. 11. A major difference between FIG. 12 and FIG. 5 or FIG. 11 lies that the second bias voltage 503 generated by the voltage generator 55 in FIG. 12 is not adjusted by the control signal, and the second bias voltage 503 output by the voltage generator 55 is a stable value. There is a voltage adjustment circuit 551 within the RF part 43 in FIG. 12, and a structure of the voltage adjustment circuit 551 may be the same as that of the voltage adjustment circuit 551 described above. In the adjustment mode, the voltage adjustment circuit 551 is configured to receive or read the control signal 502 from the register 54. The voltage adjustment circuit 551 adjusts, under an action of the control signal 502, the first bias voltage of the single-ended reference signal 500 generated by the RF part 43. Specifically, the RF part 43 further includes a differential-to-single-ended circuit 4216 and the down-converter 4212 shown in FIG. 4.

In FIG. 12, when the communications apparatus is in the operation mode, the down-converter 4212 is configured to receive an RF signal and convert the RF signal to an in-phase I analog baseband signal and a quadrature Q analog baseband signal that are orthogonal to each other. The I and Q signals are sent to the differential-to-single-ended circuit 4216, and the differential-to-single-ended circuit 4216 receives the I and Q signals and converts the I and Q signals to the single-ended analog baseband signal 500. The single-ended analog baseband signal 500 is transmitted to the interface 4420. For the subsequent operation process of demodulating the signal by the baseband processor 44, refer to the embodiment in FIG. 8, and details are not further described herein.

In FIG. 12, when the communications apparatus works in the adjustment mode, the down-converter 4212 does not work, and the differential-to-single-ended circuit 4216 receives a differential reference signal instead of the IQ signals, and generates the single-ended reference signal 500. The differential reference signal may be generated by the baseband processor 44 and transmitted to the differential-to-single-ended circuit 4216 of the RF part 43. Alternatively, the RF part 43 itself may include a circuit that generates the differential reference signal, and this is not limited in this embodiment. The differential reference signal may be considered as a differential form of the reference signal 70 shown in FIG. 7 and may become the single-ended reference signal 500 after being transformed by the differential-to-single-ended circuit 4216. The voltage adjustment circuit 551 generates a direct-current first bias voltage 504 under an action of the control signal 502. The first bias voltage 504 is input to the differential-to-single-ended circuit 4216 to adjust a value of a direct-current signal or a large signal of the generated single-ended reference signal 500 to the first bias voltage 504. For more details of the adjustment, refer to FIG. 9 and the corresponding embodiment, and descriptions are not provided herein.

As another alternative implementation of FIG. 12, FIG. 13 is a schematic diagram of how another baseband processor 44 adjusts a bias voltage. An implementation form used by a voltage controller 53 in FIG. 13 is similar to that in FIG. 11, and may be considered as a combination of a part in FIG. 11 and a part in FIG. 12. For an operation process of the communications apparatus in an operation mode in FIG. 13, refer to the descriptions corresponding to FIG. 5 and the descriptions corresponding to FIG. 8. In an adjustment mode, for an operation principle of the voltage controller 53 of the communications apparatus in FIG. 13, refer to the descriptions in the embodiment corresponding to FIG. 11. For an operation principle of the voltage adjustment circuit 551 of the communications apparatus, refer to the descriptions in the embodiment corresponding to FIG. 12. Details about an operation process and a structure that are similar to those in the foregoing embodiments are not further described herein.

Figure 14:
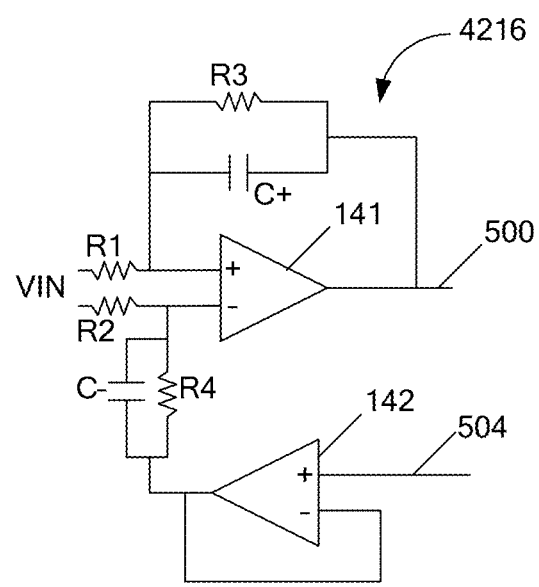
FIG. 14 is a simplified schematic diagram of a differential-to-single-ended circuit according to an embodiment of the present disclosure.

For an implementation of the differential-to-single-ended circuit 4216 in FIG. 12 or FIG. 13, refer to FIG. 14. FIG. 14 is a schematic diagram of a specific differential-to-single-ended circuit 4216 according to an embodiment of the present disclosure. The differential-to-single-ended circuit 4216 includes a first amplifier 141 and a second amplifier 142. A resistor R3 and a capacitor C+ that are connected in parallel are included between an output end and a positive input end of the first amplifier 141. A resistor R4 and a capacitor C− are included between a negative input end of the first amplifier 141 and an output end of the second amplifier 142. Values of the resistors R4 and R3 are equal. Values of the capacitors C+ and C− are equal. In addition, the positive input end and the negative input end of the first amplifier 141 are further connected to resistors R1 and R2 respectively. Values of the resistors R1 and R2 are equal. Another end of the resistor R1 and another end of the resistor R2 receive signals VIN. In an adjustment mode, the first amplifier 141 receives a differential reference signal by using the resistors R1 and R2, and outputs a single-ended reference signal 500 at the output end. A negative input end and the output end of the second amplifier 142 are short-circuited to form a voltage follower. A positive input end of the second amplifier 142 receives a direct-current first bias voltage 504. The voltage follower implements buffering and direct current blocking functions. A buffer is formed between the first bias voltage 504 and the amplifier 141. After passing through the voltage follower formed by the second amplifier 142, the first bias voltage 504 passes through the resistor R4 and the capacitor C-, to reach the negative input end of the first amplifier 141, so that a direct-current voltage of the single-ended reference signal 500 output by the first amplifier 141, that is, a large-signal voltage, is equal to the first bias voltage 504, and a small signal of the single-ended reference signal 500 is affected by the input VIN. The small signal is a single-ended signal converted from the differential input signal VIN. In an operation mode, the VIN signals received by the first amplifier 141 by using the resistors R1 and R2 are I and Q signals, and a first bias voltage 504 of a single-ended analog baseband signal output by the output end remains unchanged.

In the embodiment corresponding to FIG. 5 and the embodiment corresponding to FIG. 12, the voltage controller 53 may be a DSP. The DSP is a circuit that performs only digital operation processing. In the embodiment corresponding to FIG. 11 and the embodiment corresponding to FIG. 13, in addition to a digital signal processing circuit, the voltage controller 53 may further include the comparator 532 in a form of an analog circuit.

The communications apparatuses provided in the foregoing embodiments may work in the adjustment mode to adjust the common-mode voltage or the direct-current bias voltage of the analog-to-digital converter 50 or work in the operation mode to demodulate the RF signal for communication. The communications apparatus may be in the adjustment mode before operating formally. For example, when the communications apparatus starts up, or restarts, or is in a specified application scenario, the communications apparatus may enter the mode automatically, and perform adjustment for a period of time, so that the direct-current voltage of the single-ended reference signal 500 output by the RF part 43, that is, the first bias voltage, may be close as much as possible to the second bias voltage 503 generated by the voltage generator. However, during a subsequent operation, the magnitude of the first bias voltage of the single-ended analog baseband signal generated by the RF part remains unchanged relative to the first bias voltage in the adjustment mode, that is, maintains stable. Therefore, the difference is not quite large between the first bias voltage and the second bias voltage 503 of the single-ended analog baseband signal. This reduces implementation and design difficulty of the analog-to-digital converter 50.

Besides the communications apparatus works in the adjustment mode during startup or restart or a specified application scenario, the adjustment mode may be in another application form. For example, the adjustment process may be performed on the communications apparatus by a device manufacturer or a testing manufacturer before the communications apparatus is used or sold. After the device manufacturer or the testing manufacturer performs the adjustment at a debugging stage, the adjustment is not required after the communications apparatus starts up or restarts. A large-signal voltage or a direct-current signal voltage of an analog circuit of the RF part 43 and the analog-to-digital converter 50, that is, the first bias voltage, is generally unchanged. A use requirement can be met only provided that the adjustment function is implemented at a testing or development stage of the communications apparatus. Therefore, a more common implementation of this embodiment is that the adjustment function is complete in a manufacturing, debugging, or testing process of the communications apparatus.

It may be understood that a wireless base station or a wireless terminal in wireless cellular communication is used as an example of the communications apparatus mentioned in the embodiments, but no limitation is imposed thereto on a specific form of the communications apparatus. Alternatively, the communications apparatus may be a short-distance wireless communications device. The short-distance wireless communications device may comply with or support, including but not limited to, one or more of a WiFi protocol, a Bluetooth protocol, an infrared protocol, or an NFC protocol. In this embodiment, no strict limitation is imposed on the communications protocol with which the communications apparatus complies.

For example, the communications apparatus mentioned above in the present disclosure may include one or more semiconductor chips. A semiconductor is referred to as a chip for short, and is a circuit entity that is integrated onto a semiconductor substrate by using an integrated circuit production technology. For example, a large quantity of MOS (Metal Oxide Semiconductor) transistor circuits may be included. However, the embodiments also include a technical solution in which some components of the communications apparatus are not implemented by using a chip technology. For example, some components of the communications apparatus may be separate components located outside the chip, and are not all integrated within the chip.

It should be understood that the "couple" mentioned in the embodiments of the present disclosure may be a direct connection, for example, a connection by using a wire, or may be a connection by using one or multiple other components and parts, or may be interaction due to a physical phenomenon such as electromagnetic induction. A meaning of the "couple" is not limited to the direct connection in a narrow sense.

The foregoing are merely some embodiments of the present disclosure. A person skilled in the art may make various modifications and variations to the present disclosure without departing from the scope of the present disclosure. For example, a specific shape or structure of each part in an accompanying drawing in the embodiments of the present disclosure may be adjusted according to an actual application scenario.

What is claimed is:

1. A bias-voltage-adjustable communications apparatus, comprising:
 a radio frequency (RF) part;
 an analog-to-digital converter;
 a digital baseband communications processor;
 a voltage controller;
 a voltage generator;
 wherein the RF part is coupled to the analog-to-digital converter and the voltage controller, the voltage generator is coupled to the analog-to-digital converter and the voltage controller, the analog-to-digital converter is coupled to the digital baseband communications processor, and the communications apparatus is configured to work in an adjustment mode and an operation mode, wherein:
 in the adjustment mode:
   the RF part is configured to generate a single-ended reference signal, wherein the single-ended reference signal comprises a first bias voltage,
   the voltage generator is configured to generate a second bias voltage, and the voltage controller is configured to obtain a difference between the first bias voltage and the second bias voltage, and generate a control signal based on the difference for adjusting the first bias voltage or the second bias voltage to decrease the difference; and in the operation mode:
the RF part is configured to receive an RF signal, and perform down-conversion on the RF signal to convert the RF signal to a single-ended analog baseband signal, wherein the single-ended analog baseband signal comprises the first bias voltage or the adjusted first bias voltage,
the voltage generator is configured to generate the second bias voltage or the adjusted second bias voltage,
the analog-to-digital converter is configured to:
receive the single-ended analog baseband signal from the RF part,
receive the second bias voltage or the adjusted second bias voltage from the voltage generator, and
convert the single-ended analog baseband signal to a digital baseband signal under an action of the second bias voltage or the adjusted second bias voltage; and
the digital baseband communications processor is configured to demodulate the digital baseband signal.

2. The communications apparatus according to claim 1, wherein the RF part comprises a voltage adjustment circuit and a differential-to-single-ended circuit coupled to the voltage adjustment circuit; and
in the adjustment mode:
the differential-to-single-ended circuit is configured to receive a differential reference signal, and generate the single-ended reference signal according to the differential reference signal, and
the voltage adjustment circuit is configured to receive the control signal, and adjust, under an action of the control signal, the first bias voltage of the single-ended reference signal generated by the differential-to-single-ended circuit.

3. The communications apparatus according to claim 2, wherein the RF part further comprises a down-converter coupled to the differential-to-single-ended circuit; and
in the operation mode:
the down-converter is configured to receive the RF signal, and convert the RF signal to an in-phase I analog baseband signal and a quadrature Q analog baseband signal that are orthogonal to each other, and
the differential-to-single-ended circuit is configured to receive the I analog baseband signal and the Q analog baseband signal, and generate the single-ended analog baseband signal.

4. The communications apparatus according to claim 1, wherein the voltage generator comprises a voltage adjustment circuit; and
in the adjustment mode, the voltage adjustment circuit is configured to generate the second bias voltage, and adjust the second bias voltage under an action of the control signal.

5. The communications apparatus according to claim 1, wherein the RF part is coupled to both the analog-to-digital converter and the voltage controller, and the voltage generator is coupled to both the analog-to-digital converter and the voltage controller;
the voltage controller comprises a comparator and a first digital signal controller; and
in the adjustment mode:
the comparator is configured to compare the single-ended reference signal and the second bias voltage to obtain a comparison result, and use the result as the difference, and
the first digital signal controller is configured to receive the difference from the comparator, and generate the control signal based on the difference.

6. The communications apparatus according to claim 1, wherein the RF part is coupled to the voltage controller by using the analog-to-digital converter, the voltage generator is coupled to the voltage controller by using the analog-to-digital converter, and the voltage controller comprises a second digital signal controller; and
in the adjustment mode:
the analog-to-digital converter is configured to convert a deviation between the single-ended reference signal and the second bias voltage to a digital deviation, and
the second digital signal controller is configured to estimate the difference according to the digital deviation, and generate the control signal based on the difference.

7. The communications apparatus according to claim 5, further comprising a register, coupled to the voltage controller and configured to temporarily store the control signal.

8. The communications apparatus according to claim 1, wherein:
the RF part is integrated into a first semiconductor chip;
the analog-to-digital converter, the digital baseband communications processor, the voltage controller, and the voltage generator are integrated into a second semiconductor chip;
the first semiconductor chip is coupled to the second semiconductor chip by using a single-ended transmission line;
in the adjustment mode, the single-ended transmission line is configured to transmit the single-ended reference signal; and
in the operation mode, the single-ended transmission line is configured to transmit the single-ended analog baseband signal.

9. The communications apparatus according to claim 1, further comprising:
an antenna; and
a radio frequency front-end component, wherein:
the antenna is configured to receive the RF signal; and
the radio frequency front-end component is configured to receive the RF signal from the antenna, and couple the RF signal to the RF part.

10. The communications apparatus according to claim 1, wherein the adjustment mode continues for a preset time or a preset quantity of periods; and within the preset time or the preset quantity of periods, the voltage controller adjusts the first bias voltage or the second bias voltage for multiple times by using the control signal, to decrease the difference.

11. The communications apparatus according to claim 1, wherein the communications apparatus is a wireless base station or a wireless terminal.

12. A method for performing communication by a bias-voltage-adjustable communications apparatus, wherein the communications apparatus is configured to work in an adjustment mode and an operation mode, the method comprising:
    in the adjustment mode:
        generating a single-ended reference signal, wherein the single-ended reference signal comprises a first bias voltage,
        generating a second bias voltage, and
        obtaining a difference between the first bias voltage and the second bias voltage, and generating a control signal based on the difference for adjusting the first bias voltage or the second bias voltage to decrease the difference; and
    in the operation mode:
        receiving a radio frequency RF signal, and performing down-conversion on the RF signal to convert the RF signal to a single-ended analog baseband signal, wherein the single-ended analog baseband signal comprises the first bias voltage or the adjusted first bias voltage,
        generating the second bias voltage or the adjusted second bias voltage,
        converting the single-ended analog baseband signal to a digital baseband signal under an action of the second bias voltage or the adjusted second bias voltage, and
        demodulating the digital baseband signal.

13. The method according to claim 12, wherein in the adjustment mode:
    generating the single-ended reference signal comprises:
        receiving a differential reference signal, and generating the single-ended reference signal; and
    after generating the control signal based on the difference, adjusting the first bias voltage of the single-ended reference signal under an action of the control signal.

14. The method according to claim 13, wherein receiving the RF signal, and converting the RF signal to a single-ended analog baseband signal, in the operation mode, comprises:
    receiving the RF signal, and converting the RF signal to an in-phase I analog baseband signal and a quadrature Q analog baseband signal that are orthogonal to each other; and
    receiving the I analog baseband signal and the Q analog baseband signal, and generating the single-ended analog baseband signal.

15. The method according to claim 12, further comprising:
    in the adjustment mode, after generating the control signal based on the difference, adjusting the second bias voltage under an action of the control signal.

16. The method according to claim 12, wherein obtaining the difference between the first bias voltage and the second bias voltage comprises:
    comparing, by a comparator, the single-ended reference signal and the second bias voltage, to obtain a comparison result, and using the result as the difference; or
    converting a deviation between the single-ended reference signal and the second bias voltage to a digital deviation, and estimating the difference according to the digital deviation.

17. The method according to claim 12, wherein the adjustment mode continues for a preset time or a preset quantity of periods, and the control signal is configured to adjust the first bias voltage or the second bias voltage for multiple times within the preset time or the preset quantity of periods, to decrease the difference.

* * * * *